United States Patent
Miyamoto et al.

(10) Patent No.: US 6,340,555 B1
(45) Date of Patent: *Jan. 22, 2002

(54) INFORMATION RECORDING MEDIUM AND INFORMATION RECORDING AND REPRODUCING APPARATUS USING THE SAME

(75) Inventors: Makoto Miyamoto, Ome; Motoyasu Terao; Yukio Fukui, both of Tokyo; Nobuhiro Tokushuku, Yokohama; Keikichi Andoo, Musashino; Tetsuya Nishida, Tokyo; Akemi Hirotsune, Higashimurayama; Yasushi Miyauchi, Akishima; Koichi Moritani, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/637,879

(22) Filed: Aug. 15, 2000

Related U.S. Application Data

(63) Continuation of application No. 08/978,043, filed on Nov. 25, 1997, now Pat. No. 6,132,932.

(30) Foreign Application Priority Data

Nov. 25, 1996 (JP) .............................................. 8-313325
Dec. 9, 1996 (JP) .............................................. 8-328183

(51) Int. Cl.⁷ .................................................. G11B 7/24
(52) U.S. Cl. ............... 430/270.13; 430/945; 369/275.2; 369/275.5; 428/64.2; 428/64.5; 428/64.6
(58) Field of Search ........................... 430/945, 270.13; 369/275.2, 275.5; 428/64.2, 64.5, 64.6

(56) References Cited

U.S. PATENT DOCUMENTS

| | | | |
|---|---|---|---|
| 4,954,379 A | 9/1990 | Nishida et al. | 428/64.6 |
| 4,956,243 A | 9/1990 | Miyake et al. | 428/694 |
| 5,395,669 A | 3/1995 | Kawahara et al. | 428/64.6 |
| 5,415,914 A | 5/1995 | Arioka et al. | 430/945 |
| 5,439,752 A | 8/1995 | Yoshioka et al. | 430/945 |
| 5,442,619 A | 8/1995 | Van Uijen et al. | 430/270.13 |
| 5,545,454 A | 8/1996 | Yamada et al. | 430/945 |
| 5,648,161 A | 7/1997 | Miyazawa et al. | 428/332 |

(List continued on next page.)

FOREIGN PATENT DOCUMENTS

| | | |
|---|---|---|
| EP | 0484945 A2 | 5/1992 |
| GB | 2158281 | 11/1985 |
| JP | A-58-158052 | 9/1983 |
| JP | 02-3308455 | 12/1990 |
| JP | 03-104037 | 5/1991 |
| JP | 3-272032 | 12/1991 |
| JP | 04-305837 | 10/1992 |
| JP | 6-76361 | 3/1994 |

OTHER PUBLICATIONS

J.H. Coombs et al., "A CD–compatible erasable disc", Proceeding of Topical Meeting on Optical Data Storage, 1994, pp. 94–106.

(List continued on next page.)

Primary Examiner—Martin Angebranndt
(74) Attorney, Agent, or Firm—Antonelli, Terry, Stout & Kraus, LLP

(57) ABSTRACT

An information recording medium which includes at least a recording layer, and first and second metallic layers disposed on an opposite side of an energy beam incident side of the recording layer and having different compositions, and in which the first one of the first and second metallic layers located closer to the recording layer contains Al, Ag, Au, Pt and Pd as its main components and a sum of contents of these atoms is 60% or more. Thereby recording and reproducing of information can be realized with a high reliability.

24 Claims, 5 Drawing Sheets

17 ULTRAVIOLET CURING RESIN PROTECTIVE LAYER
17 ULTRAVIOLET CURING RESIN PROTECTIVE LAYER
16 SECOND METALLIC LAYER
15 FIRST METALLIC LAYER
14 SECOND PROTECTIVE LAYER
13 RECORDING LAYER
12 FIRST PROTECTIVE LAYER
11 POLYCARBONATE SUBSTRATE

U.S. PATENT DOCUMENTS

| | | | | |
|---|---|---|---|---|
| 5,688,574 A | | 11/1997 | Tamura et al. | 430/270.13 |
| 5,709,978 A | | 1/1998 | Hirotsune et al. | 430/270.13 |
| 5,786,078 A | | 7/1998 | Sekiya et al. | 369/275.5 |
| 5,818,808 A | | 10/1998 | Takada et al. | 369/275.5 |
| 5,871,881 A | | 2/1999 | Nishida et al. | 430/945 |
| 5,958,649 A | * | 9/1999 | Hirotsune et al. | 430/270.13 |
| 6,132,932 A | * | 10/2000 | Miyamoto et al. | 430/270.13 |

OTHER PUBLICATIONS

Hirotsune et al. "High–Density Recording on phase–change . . . ", *Proc. Int. Symp. Optical Memory,* pp. 151–152.

Coombs et al., "A CD–Compatible erasible disc", Proc. Topical Meeting on Optical Data Storage, pp. 94–106.

Patent Abstracts of Japan, Publication No. 08096413, Publication date: Apr. 12, 1996.

Patent Abstracts of Japan, Publication No. 07169101, Publication date: Jul. 4, 1995.

Patent Abstracts of Japan, Publication No. 04360039, Publication date: Dec. 14, 1992.

Patent Abstracts of Japan, Publication No. 04134641, Publication date: May 8, 1992.

* cited by examiner

INFORMATION RECORDING MEDIUM AND INFORMATION RECORDING AND REPRODUCING APPARATUS USING THE SAME

This application is a Continuation application of application Ser. No. 08/978,043, filed Nov. 25, 1997, now U.S. Pat. No. 6,132,932.

BACKGROUND OF THE INVENTION

The present invention relates to an information recording medium for recording information therein when receiving an energy beam and also to an information recording and reproducing apparatus which uses the information recording medium. More particularly, the present invention concerns an erasable optical disk such as a phase change type optical disk or a magneto-optical disk and also concerns an information recording and reproducing apparatus capable of reproducing information from the erasable optical disk and a read-only optical disk.

This type of technique is disclosed in JP-A-272032 in which two metallic layers are provided so that first one of the two first and second metallic layers closer to a recording layer is set to be lower in thermal conductivity than the other second metallic layer, the first metallic layer is disposed as opposed to the second metallic layer, and the recording layer is disposed between the first and second metallic layers.

Further disclosed in a Proceeding of International Symposium on Optical Memory, 1995, pp. 151 and 152 is the fact that a semiconductor thin film of Si or the like material having a large transmittance is used in place of the aforementioned first metallic layer.

In general, reproduction compatibility conditions of the information recording and reproducing apparatus with the read-only optical disk are that the stabilities of tracking servo, focusing servo, etc. should be taken into consideration, a medium reflectivity be 15% or more, and the modulation of a reproduced signal be 50% or more when the quality of the reproduced signal is taken into consideration.

Known as one of information recording media satisfying the above conditions is such an information recording medium using a metal such as Au having a high reflectivity as shown in a paper entitled "A CD-compatible erasable disc", by J. H. Coombs, et al., in Proceedings of Topical Meeting on Optical Data Storage, 1994, pp. 94–106. Also known as another information recording medium is an information recording and reproducing system for recording, on such an information recording medium, information modulated based on the same modulation system as the read-only optical disk or an information reproducing system therefor. An optical recording disk is disclosed in JP-A-6-76361.

SUMMARY OF THE INVENTION

It is therefore an object of the present invention to provide an information recording medium which can provide a good recording sensitivity and produce a good reproduced signal, and also to provide an information recording and reproducing apparatus using the above information recording medium, which can have a high reliability at the time of recording and reproducing information.

In accordance with a first aspect of the present invention, there is provided an information recording medium which comprises a recording layer for recording information in the form of a recording mark based on atomic array change and/or electronic state change caused by irradiation of an energy beam, the recording mark being reproduced by irradiating the energy beam on the recording mark; and first and second metallic layers formed as opposed to an energy beam incident side of the recording layer and having different compositions, and wherein first one of the first and second metallic layers disposed closer to the recording layer contains Al, Cu, Ag, Au, Pt and Pd as its main components and a sum of contents of these atoms is 60% or more.

In the present invention, the second metallic layer contains Al, Cu, Ag, Au, Pt and Pd as its main components and a sum of contents of these atoms is larger than that of the first metallic layer.

In accordance with a second aspect of the present invention, there is provided an information recording and reproducing apparatus for reproducing information from an information recording medium, which apparatus comprises the information recording medium of the aforementioned first aspect including a recording layer for recording information in the form of a recording mark based on atomic array change and/or electronic state change caused by irradiation of an energy beam, the recording mark being reproduced by irradiating the energy beam on the recording mark, and also including first and second metallic layers formed as opposed to an energy beam incident side of the recording layer and having different compositions, wherein first one of the first and second metallic layers disposed closer to the recording layer contains Al, Cu, Ag, Au, Pt and Pd as its main components and a sum of contents of these atoms is 60% or more; a laser beam irradiating circuit for reproducing the recording mark from the information recording medium; and an address information detecting circuit for detecting address information from an electrical signal obtained by reproducing an address information mark provided on the information recording medium.

In accordance with a third aspect of the present invention, there is provided an information recording and reproducing apparatus for recording and reproducing information in and from an information recording medium, which apparatus comprises the information recording medium of the aforementioned first aspect including a recording layer for recording information in the form of a recording mark based on atomic array change and/or electronic state change caused by irradiation of an energy beam, the recording mark being reproduced by irradiating the energy beam on the recording mark, and also including first and second metallic layers formed as opposed to an energy beam incident side of the recording layer and having different compositions, wherein first one of the first and second metallic layers disposed closer to the recording layer contains Al, Cu, Ag, Au, Pt and Pd as its main components and a sum of contents of these atoms is 60% or more; a laser beam irradiating circuit for recording and reproducing the recording mark on and from the information recording medium; and a recorded signal modulating circuit and a recorded signal demodulating circuit for performing the recording operation of the recording marks having lengths associated with an information signal.

In accordance with yet a fourth aspect of the present invention, there is provided an information recording and reproducing apparatus in which a protective layer of a recording medium is made up of 2 first and second layers. The first protective layers is made of $(ZnS)_{80}(SiO_2)_{20}$ (molar ratio). However, the first protective layer may be made of preferably a mixture composition (15–20 mol % of $SiO_2$) of ZnS and $SiO_2$ having a mixture ratio different from the above case or a mixture composition of ZnS and 10–40 mol % of oxide which will be given below, though its recording sensitivity and jitter become somewhat bad when compared with the above case. The oxide to be mixed in the above case is preferably $SiO_2$, $SiO$, $TiO_2$, $Al_2O_3$, $Y_2O_3$, $CeO$, $La_2O_3$, $In_2O_3$, $GeO$, $GeO_2$, $PbO$, $SnO$, $SnO_2$, $Bi_2O_3$, $TeO_2$, $WO_2$, $WO_3$, $SC_2O_3$, $Ta_2O_5$ or $ZrO_2$. Usable as the material of the protective layer in addition to the above is an oxide such as Si—O—N material or Si—Al—O—N material, or Cr—O material such as $Cr_2O_3$, CrO or Co—O material such as $Co_2O_3$, CoO, an nitride such as TaN, AlN, Si—N material such as $Si_3N_4$, Al—Si—N material (e.g., $AlSiN_2$), or Ge—N material a sulfide such as ZnS, $Sb_2S_3$, CdS, $In_2S_3$, $Ga_2S_3$, GeS, $SnS_2$, PbS or $Bi_2S_3$, a selenide such as $SnSe_2$, $Sb_2Se_3$, CdSe, ZnSe, $In_2Se_3$, $Ga_2Se_3$, GeSe, $GeSe_2$, SnSe, PbSe or $Bi_2Se_3$, a fluoride such as $CeF_3$, $MgF_2$ or $CaF_2$, a composition close to the above material, or a mixture of the above materials. It is highly profitable that the protective layer comprise multi-layers of the protective layers of the ZnS-based material and a third protective layer of material other than the above ZnS-based material. In this case, the material other than the above ZnS-based material is preferably any one of an oxide, a nitride or a fluoride.

In addition to the above material, the $Al_2O_3$ of the third protective layer may be replaced more preferably by such material containing $Al_2O_3$ as its main component or $SiO_2$ as its main component, because an jitter increase appearing in the vicinity of a trailing-edge at number of rewriting of 10–100 times can be made low.

The material of the third protective layer is higher in thermal conductivity than $(ZnS)_{80}(SiO_2)_{20}$. Thus, the thickness of the third protective layer is preferably in a range of not smaller than 2 nm and not larger than 20 nm and more preferably in a range of not smaller than 4 nm and not larger than 8 nm. Such a 2-film protective layer can act to prevent the adverse influences caused by the diffusion of the material of the first protective layer into the recording layer, even when the first metallic layer of the present invention is absent or made of Si, or even when another layer is added as when such a metallic layer that is as thin as that 50% or more of read light can transmit therethrough is added between the substrate and first protective layer. Further, when a fourth protective layer made of any of the materials usable as the material of the third protective layer is provided between the recording layer and second protective layer, more enhanced effects can be obtained. The thickness of the fourth protective layer may be set to be similar to as in the third protective layer.

With the above arrangement of the information recording medium in accordance with the present invention, as mentioned above, the reflectivity can be made to be 15% or more that is sufficient for the tracking servo and focusing servo, and the reproduced signal modulation also can be made to be 50% or more. Further, since the information recording medium has the plurality of metallic layers, the optical demand can be satisfied by the reflection of the first metallic layer while the thermal characteristics can be satisfied by the thermal conduction of the other metallic layer.

In particular, when the first metallic layer contains Al, Cu, Ag, Au, Pt and Pd as its main components and the sum of contents of these atoms is set to be not smaller than 70% and not larger than 85%; the thermal conductivity can be reduced to 1/10 or less, thus improving the recording sensitivity in the record mode.

Among these metals having high reflectivity, especially Al has a small wavelength dependency on the reflectivity and relatively inexpensive. Thus, Al is most excellent because it enables easy reduction of the thermal conductivity by a minute amount of addition of Al.

Further, when the second metallic layer having a composition different from that of the first metallic layer is provided on a side of the first metallic layer opposite to the light incident side, and the compositions of the first and second metallic layers are set so that the second metallic layer is higher in the thermal conductivity and strength than the first metallic layer; there is provided an information recording medium which can provide an enhanced inter-mark thermal interference suppressing effect in the record mode, can provide a good quality of reproduced signal and a high productivity.

Furthermore, the provision of the first metallic layer having the relatively low thermal conductivity enables the total thickness of the metallic layers to be made large without reduction of the recording sensitivity. As a result, the recording layer flow of the information recording medium can be highly effectively suppressed.

The provision of a third metallic layer having a reflectivity higher than that of the first metallic layer between the second and first metallic layers enables further improvement of the optical characteristics of the information recording medium such as the reflectivity and modulation.

When a non-metallic layer having a low thermal conductivity is provided between the first and second metallic layers, the thermal characteristics can be further improved, the recording sensitivity can be made high and the thermal interference between the recording marks can be suppressed.

In the present invention, in the case of the information recording medium of a land/groove recording type in which a transparent substrate is formed therein with grooves and recording marks are recorded for both of the lands and grooves, the medium can exhibit great effects. In the case where a track pitch is smaller than the diameter (corresponding to $\lambda$/NA, where NA is the numerical aperture of an objective lens for condensing a laser beam of wavelength $\lambda$ used as the energy beam on the information recording medium) of the energy beam, there can be realized a high density recording without any generation of cross-erase.

In the information recording medium of the present invention, since the influence of the inter-mark thermal interference in the record mode is minimized, even when mark edge recording is carried out, the recording mark can be controlled to have a suitable length.

In addition, even when such a magnetic modulation recording system that a constant level of laser beam is irradiated on a disk and the orientation of an external magnetic field is modulated to record information, is employed as typically a magneto-optic disk; the information recording medium of the present invention is suitable for it. Even when the present invention is applied to a light intensity modulation system in which power level of the energy beam (laser beam) is modulated to record information, the invention can exhibit great effects. In the case of the light intensity modulation recording system, more in detail, heat tends to easily transmitted on the plane of the recording layer, which tends to influence the shape of the recording mark previously recorded or to be later recorded (thermal interference).

In the information recording medium of the present invention, on the other hand, heat is diffused selectively from the first metallic layer to the second metallic layer, thus minimizing the thermal diffusion onto the plane of the recording layer.

The above third protective layer acts to prevent mutual diffusion of the material of the first protective layer and the material of the recording layer and as a result to prevent change of the reflectivity which appears by a large number of overwriting operations. When the third layer has a thickness less than 2 nm, the effect was small. When the third layer has a thickness of not smaller than 2 nm, its reflectivity change can be suppressed to 3% or less and reached practical stability level or less. When the third layer is 4 nm thick, its reflectivity change was 2%. When the layer has a thickness of not smaller than 4 nm, its reflectivity change is not so largely different from the case of 4 nm.

Further, the phase change recording system generally tends to cause the flow of the recording layer or a change in the shape of the layer after many rewriting operations. The information recording medium of the present invention can easily suppress such deterioration.

Use of the recording layer of the composition suitable for the information recording medium of the invention enables video information compressed by such a video compression system as MPEG2 or data equivalent thereto to be recorded at an equivalent data transmission rate.

When the information recording medium of the present invention is used in the above information recording and reproducing apparatus, there is implemented an information recording and reproducing system which can record information with a high density, can output a good quality of reproduced signal and also can reproduce even a read-only optical disk.

DESCRIPTION OF THE PREFERRED EMBODIMENTS

Embodiments of the present invention will be detailed with reference to the accompanying drawings. Although a plurality of layers are stacked so as to make the most of features of these layers in the present invention, it is unnecessary for the respective layers always to be strictly separated. For example, when the layers are made to be about 10 nm or less, a composition ratio of an interface between the layers may be changed continuously as necessary. In the present invention, it is assumed that the compositions of the layers are expressed in terms of atom %.

Embodiment 1

Figure 1:
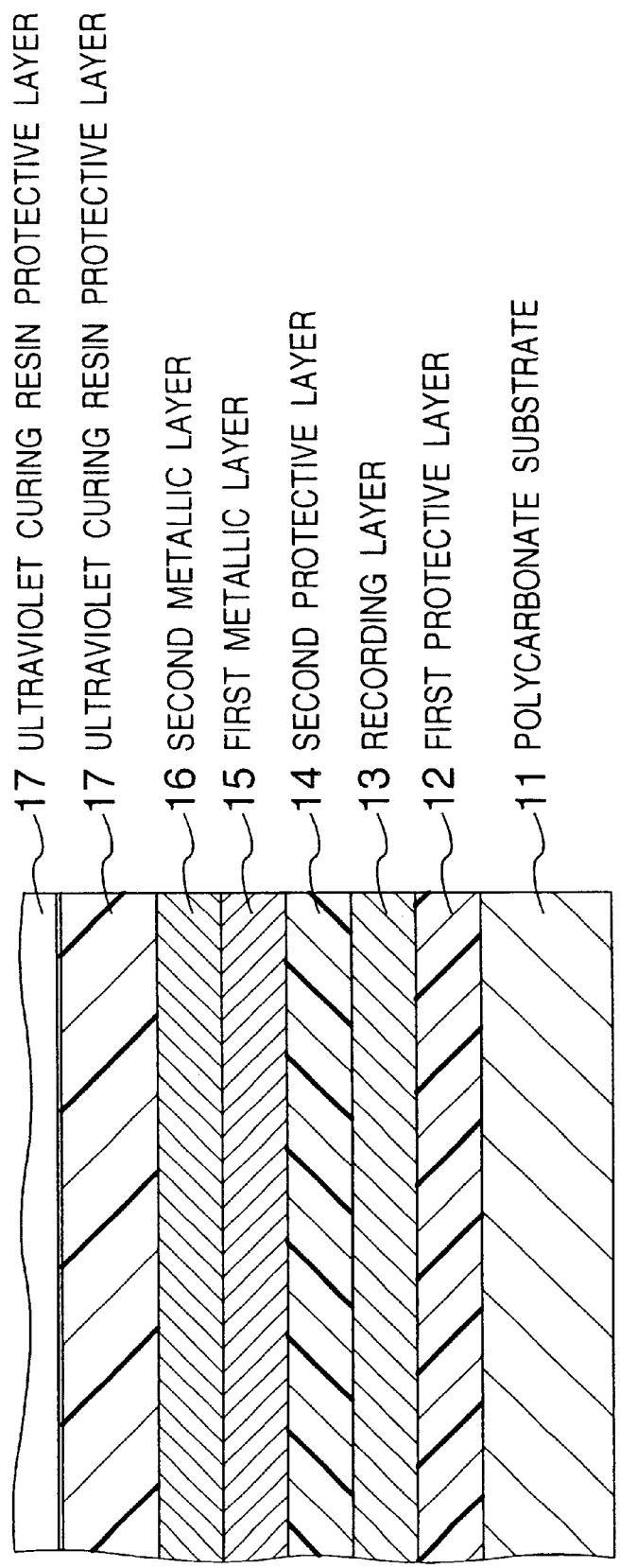
FIG. 1 is a cross-sectional view of an information recording medium in accordance with an embodiment of the present invention.

FIG. 1 shows an information recording medium 1 in accordance with an embodiment of the present invention, in which grooves having a width of 0.74 $\mu$m and a depth of 0.07 $\mu$m are made at a pitch of 1.48 $\mu$m, address information for recording of information in both lands and grooves is provided for the leading part of each sector. More in detail, the information recording medium 1 comprises, as shown in FIG. 1, layers sequentially formed by a sputtering process on a polycarbonate substrate 11 of 0.6 mm thick for recording of lands/grooves; that is, a first protective layer 12 of $(ZnS)_{80}(SiO_2)_{20}$ having a thickness of 80 nm, a recording layer 13 (phase change recording layer) of $Ag_{2.5}Ge_{21}Sb_{21}Te_{55.5}$ having a thickness of 20 nm, a second protective layer 14 of $(ZnS)_{80}(SiO_2)_{20}$ having a thickness of 20 nm, a first metallic layer 15 of $Al_{75}Cr_{25}$ having a thickness of 140 nm, and a second metallic layer 16 of $Al_{97}Ti_3$ having a thickness of 140 nm. Further coated on the second metallic layer 16 is an organic protective layer 17 of ultraviolet curing resin by a thickness of about 10 $\mu$m by a spin coating method and then cured with ultraviolet radiation. Two of such phase change recording media 1 as thus formed are bonded together at their protective layer 17. In this connection, the polycarbonate substrate may be replaced by an acrylic, APO or glass substrate.

The information recording medium 1 is provided in its radial direction with 24 user recording zones, each of which has 17–40 sectors in its one turn (circumference). A motor control method at the time of recording and reproducing employs a zone constant linear velocity (ZCLV) system by which disk rotational speed is changed for the respective recording and reproducing. zones. In this system format, disk linear velocities are different in innermost and outermost circumferences of each zone and are 6.0 m/sec. and 6.35 m/sec. respectively. In this case, the motor control method of the information recording medium 1 may employ such a method as disclosed in U.S. patent application Ser. Nos. 08/600,730 and 08/863,126 by H. Miyamoto et al and in "Information Recording Method and Information Recording Apparatus" filed on Apr. 10, 1997 by M. Miyamoto et al.

Figure 2:
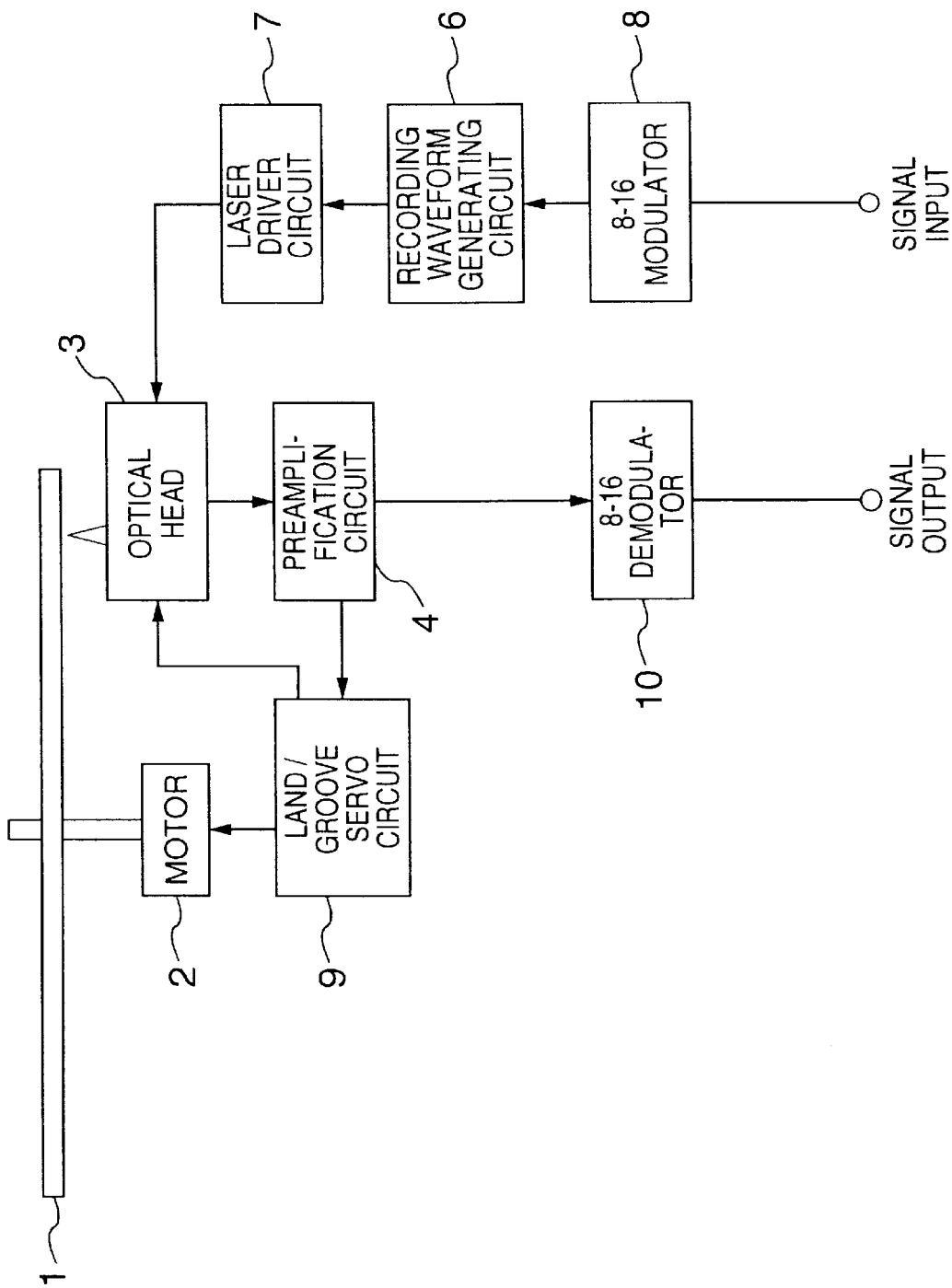
FIG. 2 is a block diagram of an information recording and reproducing apparatus in accordance with the present invention.

With use of the above information recording medium 1 and such an information recording and reproducing apparatus as shown in FIG. 2, information is recorded. Explanation will be made as to the operation of the information recording and reproducing apparatus of FIG. 2.

External information is transmitted to an 8–16 modulator 8 of the information recording and reproducing apparatus in units of 8 bits. When it is desired to record the information on the information recording medium 1, this is carried out based on a modulation system in which 8 bits of information is converted to 16 bits of information, that is, on an 8–16 modulation system. In this modulation system, information having mark lengths of 3T to 11T associated with the 8 bits of information is recorded on the information recording medium 1. This modulation is carried out at the 8–16 modulator 8 in the drawing. In this connection, reference symbol T denotes the period of a clock in an information recording mode that is set at 34.2 nsec. in this example.

A digital signal of 3T to 14T converted by the 8–16 modulator 8 is sent to a recording waveform generating circuit 6, which in turn generates a multi-pulse recording waveform signal having high power pulses each having a width of about T/2, low power pulses each having a width of about T/2 between the high power pulses and intermediate power pulses between the above series of high power pulses for laser irradiation. In this case, for formation of a recording mark, the high power pulse is set at 11.0 mW, the intermediate power pulse capable of erasing the recording mark is at 4.5 mW, and the low power pulse lower than the intermediate power pulse is at 0.5 mW.

The recording waveform signal generated by the recording waveform generating circuit 6 is sent to a laser driver circuit 7, which in turn causes a semi-conductor laser within an optical head 3 to emit light on the basis of the recording waveform signal received from the laser driver circuit 7.

The optical head 3 mounted in the present recording apparatus includes a semiconductor laser which outputs an energy beam for information recording having a wavelength of 650 nm. This laser beam is focused on the recording layer 13 of the information recording medium 1 by means of an objective lens having a numerical aperture (NA) of 0.6 and is irradiated with an energy associated with the above recording waveform signal, thus realizing recording of the information. In this case, the laser beam has a diameter of about 1 micron and is of a circular polarization type.

Further, the present apparatus employs such a system that information is recorded in both of the grooves and lands (i.e., regions located between the grooves), that is, a land/groove recording system. With the present recording apparatus, a land/groove servo circuit 9 can perform arbitrary tracking selection over the lands and grooves.

Reproduction of the recorded information is carried out also with use of the above optical head 3. That is, a laser beam converged to the same size as in the record mode is irradiated on the recorded mark, light reflected from parts other than the mark and groove is detected to thereby obtain a reproduced signal. The reproduced signal is amplified with respect to amplitude by a preamplification circuit 4 and then sent to an 8–16 demodulator 10. The 8–16 demodulator 10 converts the received signal to 8-bit information for every 16 bits. With the above operations, the reproduction of the recorded mark is completed.

When recording is carried out on the information recording medium 1 under the aforementioned conditions, the 3T mark as the shortest mark has a mark length of about 0.62 $\mu$m, while the 14T mark as the longest mark has a mark length of about 3.08 $\mu$m.

A crystallization rate of the recording layer 13 is adjusted so that a region on the information recording medium 1 irradiated by a laser beam of high one of the high, intermediate and low power pulses in the multi-pulse waveform signal is transformed to an amorphous state, and a region irradiated by a laser beam of the intermediate power pulse is transformed to a crystalline state.

In the case of the above information recording and reproducing apparatus, the information recording medium 1 at the time of the reproduction has a reflectivity of 17%. Assuming that a voltage level obtained by converting the reflected light reproduced by the 14T mark through a photoelectric element within the optical head 3 is denoted by $V_{14}$, a voltage level obtained by converting the reflected light from a non-recording-mark (crystallization) region having no recording marks through the photoelectric element is denoted by $V_0$, and $(V_0-V_{14})/V_0$ is referred to as reproduced signal modulation; then the reproduced signal modulation when the recording and reproduction are carried out under the above conditions of the information recording medium 1 is 60%.

As has been explained in detail above, when the information recording and reproducing apparatus is used in combination with the information recording medium of the present invention, there can be realized an information recording and reproducing apparatus which can reproduce information with a high density and a good quality of reproduced signal and which can also reproduce a read-only recording medium. Although explanation has been made in connection with the case where the crystallization region is higher in reflectivity than the recording mark region (amorphous region) in the foregoing embodiment, it is unnecessary that the crystallization region be higher in reflectivity than the recording mark region and thus the recording mark region may be set, as necessary, to be higher in reflectivity than the crystallization region. In the latter case, a reproduced signal modulation $(V_{14}-V_0)/V_{14}$ is designed to have a value of 50% or more and thus so that the reflected light reproduced from the 14T mark has a reflectivity of 15% or more. The above information recording and reproducing apparatus may be a hard drive having the information recording medium 1 of the present invention as a stationary disk or may be a removable disk drive having the information recording medium 1 as a removable disk.

Embodiment 2

Explanation will next be made as to features of the information recording medium 1 already explained in connection with FIG. 1. More specifically, explanation will be directed to a reflectivity and a laser power (recording power) necessary for recording when the first metallic layer 15 of the information recording medium 1 contains Co as its addition element and the recording layer 13 is put in its crystalline state. When the addition amount of Co in the first metallic layer 15 is lower than 5%, a sufficiently large reproduced signal modulation can be obtained but the recording power becomes 13 mW or more, which is not practical. When the addition amount of Co is 35% or more, the recording power becomes as very low as 9 mW or less but the reproduced signal modulation becomes 50% or less, whereby a practical quality of reproduced signal cannot be obtained. When the addition amount of Co is not less than 5% and not larger than 35%, the recording power becomes 13 mW or less and the reproduced signal modulation becomes 50% or more, which is practical. In this case, the reflectivity from the crystallization-state layer has a value as good as 15–24%. Similar effects to the above can be obtained even when Ti, Cr, Ni, Mg, Si, V, Ca, Fe, Zn, Zr, Nb, Mo, Rh, Sn, Sb, Te, Ta, W, Ir, Pb, B or C is used as the addition element in place of Co. In particular, when Co, Cr, Ti, Ni, Fe or Cu is used as the addition element, great effects can be obtained. When an Al content is within 65–95% regardless of the type of the addition element, great effects can be obtained. When the Al content is, in particular, within 70–80%, a good recording sensitivity and a large reproduced signal modulation can be obtained.

When the above element Co is added to metal such as Cu, Ag, Pt or Pd having a high reflectivity other than Al, similar effects can be obtained. In particular, when Al or Au is advantageous for the first metallic layer 15, because a high quality of reproduced signal can be obtained with a high reliability even after corrosion resistance tests and many rewriting operations.

Further, Co or Ni has a relatively high reflectivity though not so high as that of the above high-reflection-factor elements, and thus when such element is contained as the addition element, there can be realized a recording medium 1 which is high in the reflectivity, modulation and recording sensitivity.

With the information recording medium 1 of the present invention, the provision of the first metallic layer 15 causes heat generated in the recording layer 13 in the record mode to tend to less diffuse in a planar direction of the recording layer 13 and to more flow selectively from the first metallic layer 15 to the second metallic layer 16. For this reason, inter-mark heat interference occurring at the time of irradiating the laser beam, which would become a problem at the time of mark edge recording, can be suppressed and thus a high quality of signal can be obtained with a low jitter.

Embodiment 3

Figure 4:
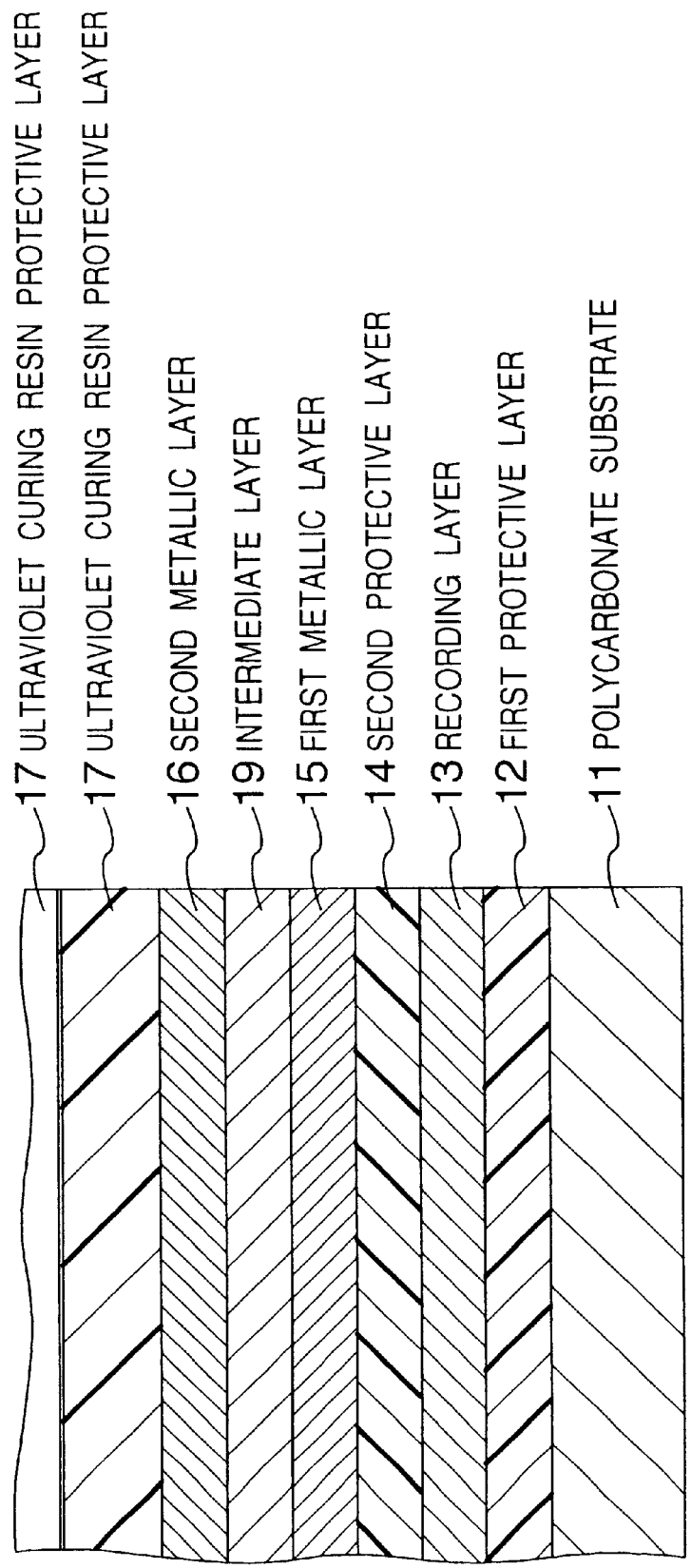
FIG. 4 is a cross-sectional view of an information recording medium in accordance with a further embodiment of the present invention.

Other features of such an information recording medium 1 as shown in FIG. 4 will then be explained. Explanation will be directed to the jitter of a reproduced signal when the second metallic layer 16 of the information recording medium 1 contains Cu as the addition element and the recording layer 13 is put in a crystalline state. When an Al content is lower than 90%, the jitter of the reproduced signal cannot have such a practical value as 10% or more. When the Al content is 90% or more, a good jitter value of 10% or less can be obtained. In this case, preferably, a reflectivity from the crystallization layer is 17%, the reproduced signal modulation is 65% and the recording power is 13 mW or less. Similar effects can be obtained even when Ti, Cr, Ni, Mg, Si, V, Ca, Fe, Zn, Zr, Nb, Mo, Rh, Sn, Sb, Te, Ta, W, Ir, Pb, B or C is used as the addition element other than Co. In particular, when the addition element is Co, Cr, Ti, Ni, Fe or Cu, great effects can be obtained. When the Al content is 90% or more regardless of the type of the addition element, great effects can be obtained. When the Al content is especially 95–98%, a good recording sensitivity and a sufficiently low jitter value can be obtained.

When the above element Co is added to metal such as Cu, Ag, Pt, Pd or Mo having a high thermal conductivity other than Al, similar effects can be obtained. In particular, when Al, Au or Mo is advantageous for the second metallic layer 16, because a high quality of reproduced signal can be obtained with a high reliability even after corrosion resistance tests and many rewriting operations.

Further, Co or Ni has a relatively high reflectivity though not so high as the above high-thermal-conductivity elements, and thus when such element Cu is contained as the addition element, there can be realized a recording medium which is high in the reflectivity, reproduced signal modulation and recording sensitivity.

With the information recording medium 1 of the present invention, the provision of the second metallic layer 16 causes heat generated in the recording layer 13 in the record mode to tend not to be stored in the first metallic layer 15 but to easily flow selectively from the first metallic layer 15 to the second metallic layer 16. For this reason, inter-mark heat interference occurring at the time of irradiating the laser beam, which would become a problem at the time of mark edge recording, can be suppressed. In addition, since the recording layer 13 can be quickly cooled, such a problem as recording film flow can less take place. Thus a high quality of signal can be obtained with a low jitter.

In the present embodiment, recording has been carried out for the phase change recording layer 13 of Ge, Sb, Te, In, Ag, etc. as major components in the information recording medium 1. However, the subject matter of the present invention is to control optical characteristics (reflectivity, reproduced signal modulation) and thermal characteristics (temperature distribution, cooling or quench rate distribution) of the recording medium 1 for recording marks by means of heat generated by the energy beam. Thus the present invention is not restricted especially to the phase change optical disk and, even when the invention is applied to a magneto-optic recording layer of Tb, Fe, Co, Dy, Gd, etc. as major components, good effects can be obtained. Further, the present invention is not limited to the erasable information recording medium. Furthermore, in the case of organic pigment recording where the state of the substrate 11 or recording layer 13 is changed for recording, only when a high power pulse laser beam is irradiated thereon, the substrate or layer changes in its state, which change is irreversible. However, as already mentioned above, the subject matter of the present invention is to control optical characteristics (reflectivity, modulation) and thermal characteristics (temperature distribution, cooling or quench rate distribution) of the recording medium for recording therein recording marks by means of heat generated from the energy beam. Therefore, the present invention can be not only limited to the erasable optical disk but also applied even to a write once, read many times (WORM) disk or a direct read after write (DRAW) disk.

Embodiment 4

Explanation will be made as to other features of the information recording medium 1 in connection with FIG. 1. In the recording medium 1 of the present invention, the optimum layer thickness ranges are present for he first and second metallic layers 15 and 16 respectively. When the first metallic layer 15 is too thin, the recording sensitivity is lowered so that the still remaining recording mark even after its recording operation involves such a problem as increased jitter; whereas, when the first metallic layer 15 is too thick, the productivity is lowered so that a fluctuation in the recording mark shape (influenced by rough crystalline grains generated around the recording mark in the record mode) involves such a problem as increased jitter. When the second metallic layer 16 is too thin, on the other hand, a fluctuation in the recording mark shape involves problems of increased jitter and recording film flow; whereas, when the second metallic layer 16 is too thick, there occur problems of a lowered recording sensitivity and increased jitter caused by the remaining recording mark. Experiments were carried out with use of the first metallic layer 15 of $Al_{77}Cr_{23}$ and the second metallic layer 16 of $Al_{95}Cu_5$ to find a relationship between the thickness of the first metallic layer 15 and jitter in the reproduced signal.

When the thickness of the first metallic layer 15 is smaller than 30 nm or is larger than 300 nm, the jitter value increases and thus it is impossible to obtain a practical jitter value of 10% or less; whereas, when the thickness of the first metallic layer 15 is not smaller than 30 nm and not larger than 300 nm, a desirable jitter value of 10% or less can be obtained. In his case, the reflectivity, reproduced signal modulation and recording power are 20%, 65% and 9.5–12.5 mW respectively, which are all preferable.

Explanation will then be made as to the thickness dependency of the second metallic layer 16 upon the reproduced signal jitter and recording power of the information recording medium 1 of the present invention after 100,000-time rewriting operations. In this case, the first metallic layer 15 is made of $Al_{77}Ni_{28}$ and the second metallic layer 16 is made of Mo.

When the thickness of the second metallic layer 16 is smaller than 50 nm, the recording power takes a good value of 9.5 mW or less, but the reproduced signal jitter after 100,000-time rewriting operations takes 10% or more that is not practical. When the thickness of the second metallic layer 16 is larger than 250 nm, on the other hand, the reproduced signal jitter after 100,000-time rewriting operations takes a good value of 8% or less but the recording power takes an undesirable value of 13 mW or more that is not practical. When the thickness of the second metallic layer 16 is not smaller than 50 nm and not larger than 250 nm, both a good jitter value of 10% or less and a high recording sensitivity of 13 mW or less can be obtained. In this case, the reflectivity reproduced and signal modulation take good values of 15% and 55% respectively. Further, when the second metallic layer 16 is made of Mo, the recording film flow can be suppressed to a large extent.

Embodiment 5

Other features of the information recording medium 1 will be explained by referring to FIG. 1. In the information recording medium 1 of the present invention, the reflectivity of the first metallic layer 15 tends to be lower than those of metals Al, Cu, Au, Ag, Pt, Pd, etc. having high reflectivity. Thus, in order to set the thicknesses of the first and second protective layers 12 and 14 and recording layer 13 suitable to provide a reflectivity of 15% or more and a reproduced signal modulation of 50% or more, proper control over the thicknesses is required. When a laser wavelength is $\lambda$ and the first protective layer 12 has a refractive index n, the first protective layer 12 is required to have preferably a thickness of $\lambda/(3n)$ to $\lambda/(6n)$. As a result, the laser beam interferes between the surface of the recording layer 13 and the surface of the transparent substrate 11 to provide a high reproduced signal modulation.

Further, the first protective layer 12 may be made of oxide, unsaturated oxide, sulfide or nitride having refractive indexes of 1.5 or more or made of such semiconductor as Si having a small absorptance. For example, the first protective layer 12 may be made of preferably one selected from the group consisting of SiO, $SiO_2$, $In_2O_3$, $Al_2O_3$, GeO, $GeO_2$, PbO, SnO, $SnO_2$, $Bi_2O_3$, $TeO_2$, $WO_2$, $WO_3$, $Ta_2O_5$, $TiO_2$, $ZrO_2$, CdS, ZnS, CdSe, ZnSe, $In_2S_3$, $InSe_3$, $Sb_2S_3$, $Sb_2Se_3$, $Ga_2S_3$, $Ga_2Se_3$, $MgF_2$, GeS, GeSe, $GeSe_2$, SnS, SnSe, PbS, PbSe, $Bi_2Se_3$, $Bi_2Se_3$, TaN, $Si_3N_4$, AlN and Si; or mixtures of two or more selected from the above group. Generally speaking, in order to obtain a sufficient mechanical strength and to prevent water from penetrating from the polycarbonate substrate 11 and also to prevent chemical change of the recording layer 13, the first protective layer 12 is required to have a thickness of at least about 50 nm.

When the first protective layer 12 is too thick, the conditions are shifted from the above interference conditions of the laser beams. To avoid this, the first protective layer 12 is required to have an upper limit thickness of about 100 nm. In particular, when the first protective layer 12 is set to have a thickness of 70–90 nm, satisfying the conditions of the reflectivity of 15% or more and the reproduced signal modulation of 50% or more means that a ratio Rr/Rn between a reflected light level Rr from a recording mark of amorphous state which is recorded on the information recording medium 1 by a laser beam and which has a width corresponding to half or less of the width of the laser beam and a length corresponding to the laser beam width or more and a reflected light level Rn from a non-recording-mark region of a crystalline state should be not larger than 0.5 or not smaller than 2.0. In this case, a sufficient mechanical strength can be obtained and water penetration from the polycarbonate substrate 11 as well as the chemical change of the recording layer 13 can be both prevented. In particular, in the case where recording film flow is caused in the recording layer 13 by many recording operations as in the phase change recording film to deteriorate the reproduced signal, the first protective layer 12 is set to have a thickness of 70–90 nm, thereby enabling suppression of the recording film flow.

From an optical viewpoint, it is suitable that the recording layer 13 have a thickness of not smaller than 5 nm and not larger than 30 nm. In particular, when the recording layer 13 has a thickness of not smaller than 15 nm and not larger than 25 nm, the reflectivity can take 15% or more and the reproduced signal modulation can take 50% or more. However, in the case of such an ordinary recording layer that the recording film flow causes deterioration of the reproduced signal as in the phase change recording layer, when the recording layer 13 is 25 nm thick or less, the recording layer 13 tends to become low in strength and to be deteriorated. The first metallic layer 15 used in the present invention has a thermal expansion coefficient smaller than the thermal expansion coefficients of usual metals having high reflectivitys, so that the recording layer 13 is excellent in strength and, even when the recording layer 13 is set to be 25 nm thick or less, the recording film flow can be suppressed..

Substantially the same materials as in the first protective layer 12 can be employed for the material of the second protective layer 14. From an optical viewpoint, it is demanded that the second protective layer 14 be made as thin as possible. From the viewpoint of the reaction of the second protective layer 14, recording layer 13 and first metallic layer 15 or of easy heating of the recording layer 13, however, the second protective layer 14 should have a thickness of preferably not smaller than 10 nm and not larger than 40 nm. In particular, when the second protective layer 14 is set to have a thickness of not smaller than 15 nm and not larger than 30 nm, good thermal and optical characteristics can be obtained.

The above explanation has been made in connection with the case where the first protective layer 12, second protective layer 14 and recording layer 13 are made respectively in the form of a single layer.

Figure 5:
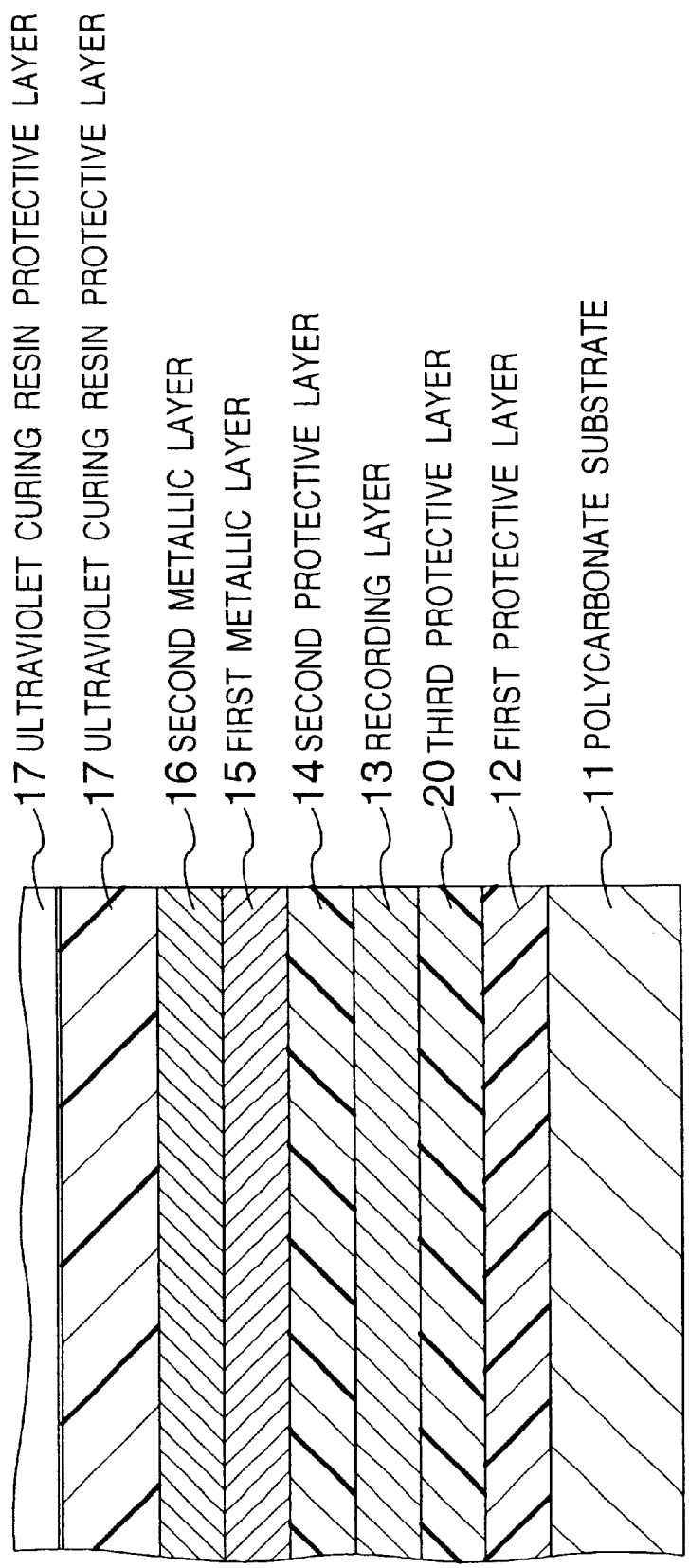
FIG. 5 is a cross-sectional view of an information recording medium in accordance with yet another embodiment of the present invention.

However, important is that the first protective layer 12 having a thickness of not smaller than 50 nm and not larger than 100 nm is provided so as to satisfy the above interference conditions of the laser beam. Thus, even when such a third protective layer 20 different in composition from the first protective layer 12 is provided adjacent to the first protective layer 12 as shown in FIG. 5, it is allowed. In particular, when the third protective layer 20 is disposed between the first protective layer 12 and recording layer 13 and the third protective layer 20 is added with a compound of Al and O, change in the reflectivity or reproduced signal modulation caused by many rewriting operations can be suppressed.

In the present embodiment, the first protective layer 2 is made of $(ZnS)_{80}(SiO_2)_{20}$ (molar ratio). However, the first protective layer 12 may be made of preferably a mixture composition (15–20 mol % of $SiO_2$) of ZnS and $SiO_2$ having a mixture ratio different from the above case or a mixture composition of ZnS and 10–40 mol % of oxide which will be given below, though its recording sensitivity and jitter become somewhat bad when compared with the above case. The oxide to be mixed in the above case is preferably $SiO_2$, SiO, $TiO_2$, $Al_2O_3$, $Y_2O_{31}$ CeO, $La_2O_3$, GeO, $GeO_2$, PbO, SnO, $SnO_2$, $Bi_2O_3$, $TeO_2$, $WO_2$, $WO_3$, $Sc_2O_3$, $Ta_2O_5$ or $ZrO_2$. Usable as the material of the protective layer in addition to the above is an oxide such as Si—O—N material or Si—Al—O—N material, or Cr—O material such as $Cr_2O_3$, CrO, or Co—O material such as $Co_2O_3$, CoO an nitride such as TaN, AlN, Si—N material such as $Si_3N_4$, Al—Si—N material (e.g., $AlSiN_2$) or Ge—N material, a sulfide such as ZnS, $Sb_2S_3$, CdS, $In_2S_3$, $Ga_2S_3$, GeS, $SnS_2$, PbS or $Bi_2S_3$, a selenide such as $SnSe_2$, $Sb_2Se_3$, CdSe, ZnSe, $In_2Se_3$, $Ga_2Se_3$, GeSe, $GeSe_2$, SnSe, PbSe or $Bi_2Se_3$, a fluoride such as $CeF_3$, $MgF_2$ or $CaF_2$, a composition close to the above material, or a mixture of the above materials. It is highly profitable that the protective layer comprise multilayers of the protective layers of the ZnS-based material and a third protective layer of material other than the above ZnS-based material. In this case, the material other than the above ZnS-based material is preferably any one of an oxide, a nitride or a fluoride.

In addition to the above material, the $Al_2O_3$ of the third protective layer may be replaced more preferably by such material containing $Al_2O_3$ as its main component or $SiO_2$ as its main component, because an jitter increase appearing in the vicinity of a trailing-edge at number of rewriting of 10–100 times can be made low.

The above third protective layer acts to prevent mutual diffusion of the material of the first protective layer and the material of the recording layer and as a result to prevent change of the reflectivity which appears by a large number of overwriting operations. When the third layer has a thickness less than 2 nm, the effect was small. When the third layer has a thickness of not smaller than 2 nm, its reflectivity change can be suppressed to 3% or less and reached practical stability. When the third layer is 4 nm thick, its reflectivity change was 2%. When the layer has a thickness of not smaller than 4 nm, its reflectivity change is not so largely different from the case of 4 nm. However, the material of the third protective layer is higher in thermal conductivity than $(ZnS)_{80}(SiO_2)_{20}$. Thus, the thickness of the third protective layer is preferably in a range of not smaller than 2 nm and not larger than 20 nm and more preferably in a range of not smaller than 4 nm and not larger than 8 nm. Such a 2-layer protective layer can act to prevent the adverse influences caused by the diffusion of the material of the first protective layer into the recording layer, even when the first metallic layer of the present invention is absent or made of Si, or even when another layer is added as when such a metallic layer that is as thin as 50% or more of read light can transmit therethrough is added between the substrate and first protective layer. Further, when a fourth protective layer made of any of the materials usable as the material of the third protective layer is provided between the recording layer and second protective layer, more enhanced effects can be obtained. The thickness of the fourth protective layer may be set to be similar to as in the third protective layer.

In this connection, the recording layer 13 and second protective layer 14 are not necessarily required to be made each as a single layer and may be made of a single layer having a plurality of compositions.

Embodiment 6

Figure 3:
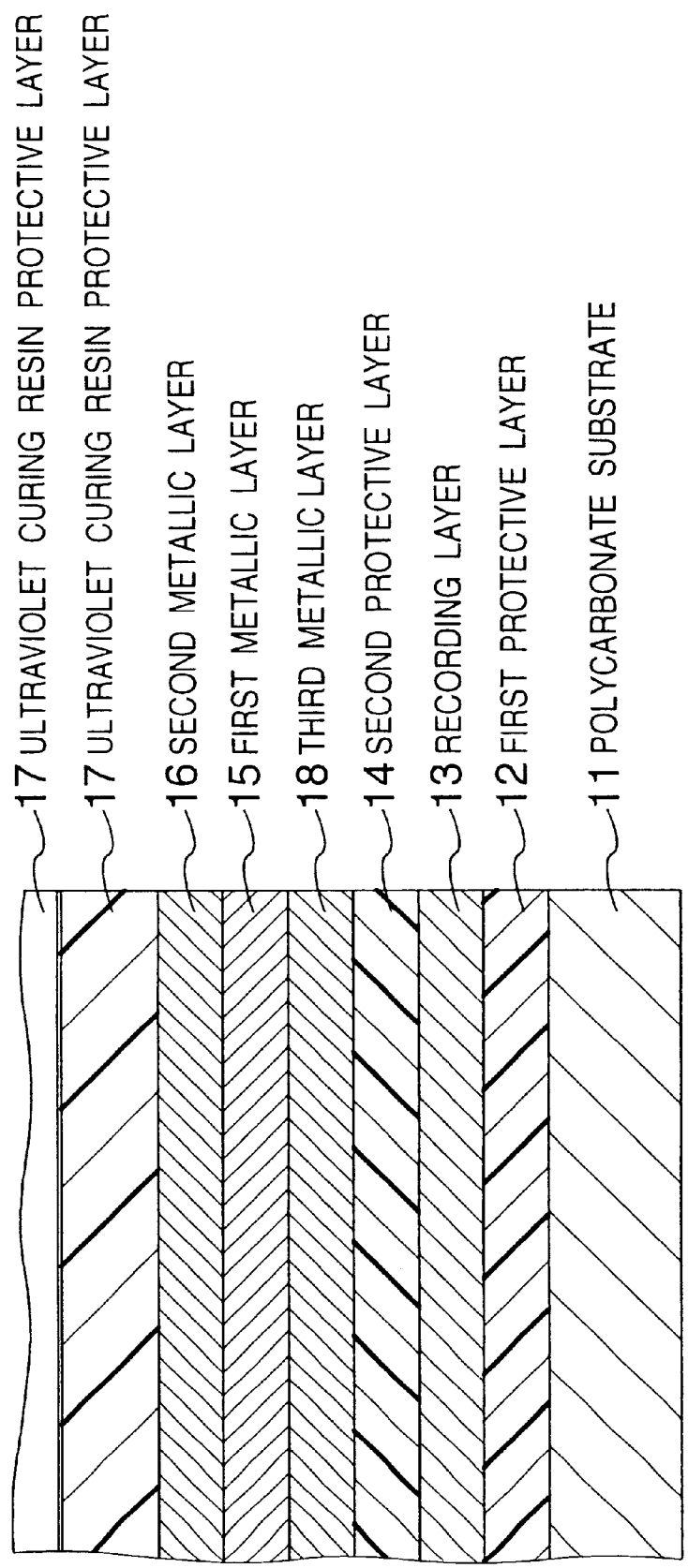
FIG. 3 is a cross-sectional view of an information recording medium in accordance with another embodiment of the present invention.

Explanation will be made as to an information recording medium 1 in accordance with another embodiment of the present invention in connection with FIG. 3. In the information recording medium 1 of the present invention, a third metallic layer 18 containing the amounts of Al, Cu, Ag, Au, Pt, Pd, etc. larger than those of the first metallic layer 15 is provided between the second protective layer 14 and first metallic layer 15 to thereby improve its reflectivity and reproduced signal modulation. However, the third metallic layer 18 has its optimum thickness range. When the third metallic layer 18 is too thick, there occur problems of increased jitter and lowered recording sensitivity.

Explanation will be made as to the thickness dependency of the third metallic layer 18 on the recording power and reproduced signal modulation of the information recording medium 1 of the present invention. In this case, the first metallic layer 15 is made of $Al_{71}Co_{29}$, the second metallic layer 16 is made of $Al_{98}Ti_2$, and the third metallic layer 18 is made of $Al_{98}Ti_2$.

When the third metallic layer 18 is 30 nm thick or more, the recording power is increased but recording cannot be realized with a practical level of 13 mW or less. When the thickness of the third metallic layer 18 is not larger than 30 nm, however, recording can be realized with the recording power of 13 mW or less. In this case, the reproduced signal modulation increases as the thickness of the third metallic layer 18 increases, and, when the third metallic layer 18 is 30 nm thick, the reproduced signal modulation becomes about 70%. In this case, the reflectivity takes a good value of 17%.

Embodiment 7

Explanation will be made as to a information recording medium 1 in accordance with other embodiment of the present invention by referring to FIG. 4. In the information recording medium 1 of the present invention, an intermediate layer 19 is provided between the first metallic layer 15 and second metallic layer 16. The intermediate layer 19 is made of oxide, low oxide, sulfide or nitride of metals (semiconductor) which follow, or semiconductor as Si. For example, the intermediate layer 19 may contain at least one selected from the group consisting of SiO, $SiO_2$, $In_2O_3$, $Al_2O_3$, GeO, $GeO_2$, PbO, SnO, $SnO_2$, $Bi_2O_3$, $TeO_2$, $WO_2$, $WO_3$, $Ta_2O_5$, $TiO_2$, $ZrO_2$, $Cr_2O_3$, CrO, $Co_2O_3$, CoO, CdS, ZnS, CdSe, ZnSe, $In_2S_3$, $InSe_3$, $Sb_2S_3$, $Sb_2Se_3$, $Ga_2Se_3$, $Ga_2Se_3$, $MgF_2$, GeS, GeSe, $GeSe_2$, SnS, SnSe, PbS, PbSe, $Bi_2Se_3$, $Bi_2Se_3$, TaN, $Si_3N_4$, AlN and Si. Thereby the recording film flow can be suppressed, the recording sensitivity can be improved, and the jitter can be reduced. Usable as the material of the intermediate layer 19 is a material of the above oxide, low oxide, sulfide, nitride or such semiconductor as Si added to the metal. The requirement demanded for the intermediate layer 19 of the present invention is that the intermediate layer 19 be smaller in thermal conductivity than at least the second metallic layer 16 and desirably than the first metallic layer 15. When the intermediate layer 19 is disposed between the first metallic layer 15 and second metallic layer 16, the optimum thickness of the first metallic layer 15 is not smaller than 30 nm and not larger than 100 nm. When the thickness of the first metallic layer 15 is smaller than 30 nm, the laser beam is passed through the first metallic layer 15 so that the optical properties (refractive index, layer thickness) of the intermediate layer 19 will undesirably influence the reproduced signal. When the first metallic layer 15 is 100 nm thick or more, the cooling or quench rate of the recording layer 13 becomes too low so that the recording layer is deteriorated and the recording mark to be formed is distorted by recrystallization. When the thickness of the first metallic layer 15 is not smaller than 50 nm and not larger than 80 nm, especially great effects can be obtained.

Further, the intermediate layer 19 has its suitable thickness range. When the thickness of the intermediate layer 19 is larger than 200 nm, the recording sensitivity becomes good but the jitter of the reproduced signal is remarkably increased under the influence of rough crystalline grains generated around the recording mark. When the intermediate layer 19 is 200 nm thick or less, the jitter of the reproduced signal takes a practical level of 10% or less. When the thickness of the intermediate layer 19 is not smaller hthan 50 nm and not larger than 100 nm, the recording film flow inherent in the phase change recording film can be suppressed, and, even after 100,000 rewriting operations, a good jitter value can be obtained and the recording film flow can be suppressed.

Embodiment 8

The recording layer 13 has its optimum composition ranges when it is desired to record, on the information recording medium 1, video information compressed such a picture compression method as Moving Picture Experts Group 2 (MPEG2) or to record the above video information at a information transmission rate equivalent to a necessary information transmission rate therefor; when the information recording medium 1 of the present invention is designed to be able to record video information based on such a picture compression method as MPEG2 or to record the above video information at a information transmission rate equivalent to a necessary information transmission rate therefor; or when it is desired to reproduce a read-only optical disk in which video information recorded therein as compressed based on such a picture compression method as the above. The reasons for it will be explained in the following. In this connection, the read-only optical disk may be used as disclosed in U.S. patent application Ser. No. 08/744,760 by S. Yonezawa et al and its two continuation-in-part applications by S. Yonezawa and filed on Sep. 17, 1997.

In general, when it is desired to reproduce video information from a read-only optical disk having the information recorded therein based on such a video compression method as MPEG2, or when it is desired to compress video information based on such a video compression method as MPEG2 and then to record it; a data transmission rate (information transmission rate) at the time of recording the information is required to have a suitable value. For example, the data transmission rate of video information compressed based on MPEG2 is about 6 Ms/sec. However, when it is desired to record or reproduce the information of such a transmission rate on or from the information recording medium 1 of the present invention, it is necessary to record and reproduce the information at a disk linear velocity of 3–12 m/sec. This is because, when the disk linear velocity is small, it becomes impossible to record and reproduce the video information on a real time basis; whereas, when the disk linear velocity is larger than the above value, it becomes impossible to process at a high rate the video information being continuously transmitted.

Further, the recording layer 13 based on the phase change recording method is required to have the optimum compositions for both the structure of the information recording medium 1 and the disk linear velocity. When the information recording medium 1 of the present invention is used, the first metallic layer 15 having a relatively small thermal conductivity is present between the second protective layer 14 and second metallic layer 16, so that it is valid for the recording layer 13 to have a composition range different from that of a general information recording medium not having the first metallic layer 15.

As a result of our much studies, it has been found that, when the disk linear velocity is set at a value of 3–12 m/sec. and it is desired to record information on the information recording medium 1 of the present invention with the shortest mark length of 0.2–0.7 $\mu$m, it is preferable that the recording layer 13 contains at least Ge, Sb and Te as its main components and is added with an addition element M of at least one or more selected from the group having Ge, Sb, Te, Ag, In, Co, Se, Ti, Cr, Ni, Mg, Si, V, Ca, Fe, Zn, Zr, Nb, Mo, Rh, Sn, Ta, W, Ir, Pb, B and C, and has a composition ratio of $(Ge_2Sb_2Te_5)_{(1-x)}+M_x$ (where $0.015<x<0.20$).

In this connection, M is not limited to a single element but may be a plurality of elements. Important herein is that one or more types of the above addition elements are added to the compound $(Ge_2Sb_2Te_5)$ so that a total sum of composition ratios for the above addition elements is not smaller than 1.5% and not larger than 10%. When the sum of composition ratios for the above addition elements is smaller than 1.5%, a recrystallization (rough crystallization) region to be generated around the recording mark and leading to a cause of increased noise becomes large, so that it becomes impossible to record and reproduce information at a high density of 12 m/sec. or less. When the sum of the composition ratios for the above addition elements is larger than 10%, it becomes impossible to erase (recrystallize) the recording mark (i.e., the recording mark remains without being erased) and becomes impossible to overwrite the information, thus increasing the reproduced signal jitter to a large extent. When the sum of composition ratios for the above addition elements is not smaller than 1.5% and not larger than 10%, it can be avoided that the noise is increased by the recrystallization of the region around the recording mark and the jitter is generated by the still remaining recording mark, thus realizing good recording and reproduction.

What is claimed is:

1. An information recording medium comprising:
   a recording layer for recording information in the form of a recording mark based on atomic arrangement change and/or electronic state change caused by irradiation of an energy beam, said recording mark being reproduced by irradiating the energy beam on the recording mark; and
   first and second metallic layers formed as opposed to an energy beam incident side of said recording layer and having different compositions,
   wherein said first metallic layer is disposed closer to said recording layer and contains at least one of Al, Cu, Ag, Au, Pt and Pd as its main component and a sum of contents of these atoms is 60% or more,
   wherein said second metallic layer contains at least one of Al, Cu, Ag, Au, Pt and Pd as its main component, and a sum of contents of these atoms in said second metallic layer is larger than that of contents of these atoms in said first metallic layer, and
   wherein said first metallic layer also includes at least one element selected from the group consisting of Ti, Cr, Co, Ni, Mg, Si, V, Ca, Fe, Zn, Zr, Nb, Mo, Rh, Sn, Sb, Te, Ta, W, Ir, Pb, B and C, and
   further comprising a transparent substrate on said energy beam incident side, and first and second protective layers disposed between said transparent substrate and said first metallic layer, said recording layer being disposed between said first and second protective layers,
   wherein said second metallic layer has an Al content of 90% or more, and
   wherein a thickness of said second metallic layer is not smaller than 50 nm and not larger than 250 nm.

2. An information recording medium as set forth in claim 1, wherein said first metallic layer has an Al content of not smaller than 65% and not larger than 95%.

3. An information recording medium as set forth in claim 1, wherein Zn and S are contained at least in any of said first and second protective layers.

4. An information recording medium as set forth in claim 3, wherein the thickness of one of said first and second protective layers closer to said transparent substrate is not smaller than 50 nm and not larger than 100 nm, the thickness of said recording layer is not smaller than 5 nm and not larger than 30 nm, and the thickness of the other protective layer is not smaller than 10 nm and not larger than 40 nm.

5. An information recording medium as set forth in claim 1, wherein a sum of the thicknesses of said first and second metallic layers is not smaller than 130 nm and not larger than 400 nm.

6. An information recording medium as set forth in claim 1, wherein grooves and lands are formed in and on said recording layers, and address information marks for recording of the recording marks are provided for both of said grooves and lands.

7. An information recording medium as set forth in claim 6, wherein recording to said grooves and lands is carried out in the form of the recording marks having a plurality of lengths associated with an information signal.

8. An information recording medium as set forth in claim 1, wherein a first power level of said energy beam is higher than a second power level thereof, a first state of said recording medium caused by said first power level is an amorphous state, and a second state thereof caused by said second power level is a crystalline state.

9. An information recording medium as set forth in claim 1, wherein said recording layer contains at least Ge, Sb and Te as its main components, is added with an addition element M of at least one element selected from the group consisting of Ag, In, Co, Se, Ti, Cr, Ni, Mg, Si, V, Ca, Fe, Zn, Zr, Nb, Mo, Rh, Sn, Ta, W, Ir, Pb, B and C, and has a composition ratio of $(Ge_2Sb_2Te_5)_{(1-x)}+M_x$ (where $0.015<x<0.20$).

10. An information recording medium as set forth in claim 1, wherein said energy beam is determined based on specifications relating to the recording and reproduction of said information recording medium so that a ratio Rr/Rn between a reflected light level Rr from a recording mark of amorphous state which is recorded on said information recording medium by a laser beam and which has a width corresponding to half or less of the width of the laser beam and has a length corresponding to the laser beam width or more and a reflected light level Rn from a non-recording mark region of a crystalline state should be not larger than 0.5 and not smaller than 2.0.

11. An information recording medium as set forth in claim 10, wherein a highest level Rh of said reflected light level is 15–24%.

12. An information recording medium as set forth in claim 1, wherein the recording of the recording mark in said recording layer is carried out with use of at least first and second power levels of said energy beam, said recording layer is changed to an amorphous state when subjected to an irradiation of said first power level and is changed to a crystalline state when subjected to an irradiation of said second power level.

13. An information recording medium as set forth in claim 1, wherein the second metallic layer has a larger thermal conductivity than that of the first metallic layer.

14. An information recording medium as set forth in claim 13, wherein the second metallic layer has a greater strength than that of the first metallic layer.

15. An information recording medium as set forth in claim 1, wherein said first and second metallic layers directly contact each other.

16. An information recording medium as set forth in claim 1, wherein said recording layer is made of material which transforms between amorphous and crystalline states upon irradiation with the energy beam.

17. An information recording medium comprising:
a recording layer for recording information in the form of a recording mark based on atomic arrangement change and/or electronic state change caused by irradiation of an energy beam, said recording mark being reproduced by irradiating the energy beam on the recording mark; and
first and second metallic layers formed as opposed to an energy beam incident side of said recording layer and having different compositions,
wherein said first metallic layer is disposed closer to said recording layer and contains at least one of Al, Cu, Ag, Au, Pt and Pd as its main component and a sum of contents of these atoms is 60% or more,
wherein said second metallic layer contains at least one of Al, Cu, Ag, Au, Pt and Pd as its main component, and a sum of contents of these atoms in said second metallic layer is larger than that of contents of these atoms in said first metallic layer, and
wherein said first metallic layer also includes at least one element selected from the group consisting of Ti, Cr, Co, Ni, Mg, Si, V, Ca, Fe, Zn, Zr, Nb, Mo, Rh, Sn, Sb, Te, Ta, W, Ir, Pb, B and C, and
further comprising a transparent substrate on said energy beam incident side, and first and second protective layers disposed between said transparent substrate and said first metallic layer, said recording layer being disposed between said first and second protective layers,
wherein Zn and S are contained at least in any of said first and second protective layers and wherein the thickness of one of said first and second protective layers closer to said transparent substrate is not smaller than 50 nm and not larger than 100 nm, the thickness of said recording layer is not smaller than 5 nm and not larger than 30 nm, and the thickness of the other protective layer is not smaller than 10 nm and not larger than 40 nm,
further comprising a third protective layer disposed between said first protective layer and said recording layer and containing a compound of Al and O.

18. An information recoding medium as set forth in claim 17, wherein the thickness of said third protective layer is not smaller than 2 nm and not larger than 20 nm.

19. An information recording medium comprising:
a recording layer for recording information in the form of a recording mark based on atomic arrangement change and/or electronic state change caused by irradiation of an energy beam, said recording mark being reproduced by irradiating the energy beam on the recording mark; and
first and second metallic layers formed as opposed to an energy beam incident side of said recording layer and having different compositions,
wherein said first metallic layer is disposed closer to said recording layer and contains at least one of Al, Cu, Ag, Au, Pt and Pd as its main component and a sum of contents of these atoms is 60% or more,
wherein said second metallic layer contains at least one of Al, Cu, Ag, Au, Pt and Pd as its main component, and a sum of contents of these atoms in said second metallic layer is larger than that of contents of these atoms in said first metallic layer, and
wherein said first metallic layer also includes at least one element selected from the group consisting of Ti, Cr, Co, Ni, Mg, Si, V, Ca, Fe, Zn, Zr, Nb, Mo, Rh, Sn, Sb, Te, Ta, W, Ir, Pb, B and C, and
further comprising a transparent substrate on said energy beam incident side, and first and second protective layers disposed between said transparent substrate and said first metallic layer, said recording layer being disposed between said first and second protective layers,
further comprising a non-metallic layer disposed between said first and second metallic layers and having a thickness of 200 nm or less.

20. An information recording medium comprising:
a recording layer for recording information in the form of a recording mark based on atomic arrangement change and/or electronic state change caused by irradiation of an energy beam, said recording mark being reproduced by irradiating the energy beam on the recording mark; and first and second metallic layers formed as opposed to an energy beam incident side of said recording layer and having different compositions, wherein said first metallic layer is disposed closer to said recording layer and contains at least one of Al, Cu, Ag, Au, Pt and Pd as its main component and a sum of contents of these atoms is 60% or more, wherein said second metallic layer contains at least one of Al, Cu, Ag, Au, Pt and Pd as its main component, and a sum of contents of these atoms in said second metallic layer is larger than that of contents of these atoms in said first metallic layer, and wherein said first metallic layer also includes at least one element selected from the group consisting of Ti, Cr, Co, Ni, Mg, Si, V, Ca, Fe, Zn, Zr, Nb, Mo, Rh, Sn, Sb, Te, Ta, W, Ir, Pb, B and C, and further comprising a transparent substrate on said energy beam incident side, and first and second protective layers disposed between said transparent substrate and said first metallic layer, said recording layer being disposed between said first and second protective layers, wherein a third protective layer is provided between said first protective layer and recording layer, and said third protective layer is made of any of an oxide, a nitride and a fluoride, and wherein said third protective layer has a thickness of not smaller than 2 nm and not larger than 20 nm.

21. An information recording medium comprising:

a recording layer for recording information in the form of a recording mark based on atomic arrangement change and/or electronic state change caused by irradiation of an energy beam, said recording mark being reproduced by irradiating the energy beam on the recording mark; and first and second metallic layers formed as opposed to an energy beam incident side of said recording layer and having different compositions, wherein said first metallic layer is disposed closer to said recording layer and contains at least one of Al, Cu, Ag, Au, Pt and Pd as its main component and a sum of contents of these atoms is 60% or more, wherein said second metallic layer contains at least one of Al, Cu, Ag, Au, Pt and Pd as its main component, and a sum of contents of these atoms in said second metallic layer is larger than that of contents of these atoms in said first metallic layer, and wherein said first metallic layer also includes at least one element selected from the group consisting of Ti, Cr, Co, Ni, Mg, Si, V, Ca, Fe, Zn, Zr, Nb, Mo, Rh, Sn, Sb, Te, Ta, W, Ir, Pb, B and C, and further comprising a transparent substrate on said energy beam incident side, and first and second protective layers disposed between said transparent substrate and said first metallic layer, said recording layer being disposed between said first and second protective layers, wherein a third protective layer is provided between said first protective layer and recording layer, and said third protective layer is made of any of an oxide, a nitride and a fluoride, and wherein a fourth protective layer is provided between said second protective layer and recording layer, and said fourth protective layer is made of any of an oxide, a nitride and a fluoride.

22. An information recording medium comprising:

a recording layer for recording information in the form of a recording mark based on atomic arrangement change and/or electronic state change caused by irradiation of an energy beam, said recording mark being reproduced by irradiating the energy beam on the recording mark; and first and second metallic layers formed as opposed to an energy beam incident side of said recording layer and having different compositions, wherein said first metallic layer is disposed closer to said recording layer and contains at least one of Al, Cu, Ag, Au, Pt and Pd as its main component and a sum of contents of these atoms is 60% or more, wherein said second metallic layer contains at least one of Al, Cu, Ag, Au, Pt and Pd as its main component, and a sum of contents of these atoms in said second metallic layer is larger than that of contents of these atoms in said first metallic layer, and wherein said first metallic layer also includes at least one element selected from the group consisting of Ti, Cr, Co, Ni, Mg, Si, V, Ca, Fe, Zn, Zr, Nb, Mo, Rh, Sn, Sb, Te, Ta, W, Ir, Pb, B and C, and further comprising a transparent substrate on said energy beam incident side, and first and second protective layers disposed between said transparent substrate and said first metallic layer, said recording layer being disposed between said first and second protective layers, and further comprising an intermediate layer between the first and second metallic layers, said intermediate layer having a smaller thermal conductivity than that of the second metallic layer.

23. An information recording medium as set forth in claim 22, wherein the intermediate layer has a smaller thermal conductivity than that of the first and second metallic layers.

24. An information recording medium as set forth in claim 22, wherein the intermediate layer is made of a material selected from the group consisting of SiO, $SiO_2$, $In_2O_3$, $Al_2O_3$, GeO, $GeO_2$, PbO, SnO, $SnO_2$, $Bi_2O_3$, $TeO_2$, $WO_2$, $WO_3$, $Ta_2O_5$, $TiO_2$, $ZrO_2$, $Cr_2O_3$, CrO, $Co_2O_3$, CoO, CdS, ZnS, CdSe, ZnSe, $In_2Se_3$, $In_2Se_3$, $Sb_2S_3$, $Sb_2Se_3$, $Ga_2S_3$, $Ga_2Se_3$, $MgF_2$, GeS, GeSe, $GeSe_2$, SnS, SnSe, PbS, PbSe, $Bi_2Se_3$, TaN, $Si_3N_4$, AlN and Si, or a mixture composition of at least two of these materials.

* * * * *

UNITED STATES PATENT AND TRADEMARK OFFICE
CERTIFICATE OF CORRECTION

PATENT NO.    : 6,340,555 B1
DATED         : January 22, 2002
INVENTOR(S)   : M. Miyamoto et al.

It is certified that error appears in the above-identified patent and that said Letters Patent is hereby corrected as shown below:

<u>Title page,</u>
Item [73], should read as follows:

-- [73]  Assignees:    Hitachi, Ltd., Tokyo, JAPAN
                      Hitachi Maxwell, Ltd., Osaka, JAPAN --

Signed and Sealed this

Eleventh Day of June, 2002

*Attest:*

*Attesting Officer*

JAMES E. ROGAN
*Director of the United States Patent and Trademark Office*